United States Patent
Tanaka

(10) Patent No.: US 9,246,854 B2
(45) Date of Patent: Jan. 26, 2016

(54) TERMINAL DEVICE

(71) Applicant: SONY MOBILE COMMUNICATIONS INC., Minato-ku (JP)

(72) Inventor: Shogo Tanaka, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 205 days.

(21) Appl. No.: 13/715,123

(22) Filed: Dec. 14, 2012

(65) Prior Publication Data

US 2013/0227033 A1 Aug. 29, 2013

Related U.S. Application Data

(60) Provisional application No. 61/604,597, filed on Feb. 29, 2012.

(51) Int. Cl.
*G06F 15/16* (2006.01)
*H04L 12/58* (2006.01)

(52) U.S. Cl.
CPC ............... *H04L 51/04* (2013.01); *H04L 51/28* (2013.01); *H04L 51/38* (2013.01)

(58) Field of Classification Search
USPC .................................. 709/206, 227; 455/466
See application file for complete search history.

(56) References Cited

U.S. PATENT DOCUMENTS

| | | | | |
|---|---|---|---|---|
| 8,307,094 | B2 * | 11/2012 | Huang | H04W 60/04 709/220 |
| 2004/0258215 | A1 * | 12/2004 | DeVito | H04M 3/42382 379/88.11 |
| 2005/0058094 | A1 * | 3/2005 | Lazaridis | H04L 12/581 370/328 |
| 2010/0174819 | A1 * | 7/2010 | Huang | H04L 65/1073 709/227 |
| 2010/0304766 | A1 * | 12/2010 | Goyal | H04L 51/34 455/466 |

FOREIGN PATENT DOCUMENTS

JP 2011-114841 6/2011

* cited by examiner

*Primary Examiner* — Tammy Nguyen
(74) *Attorney, Agent, or Firm* — Oblon, McClelland, Maier & Neustadt, L.L.P.

(57) ABSTRACT

A client device including a first message receiver that receives a first message from an external device; a second message receiver that receives a second message from the external device; a display unit that displays one of the first message received by the first message receiver and the second message received by the second message receiver; and a controller that determines whether or not a specific address or a specific keyword is stated in the body of the second message received by the second message receiver, and discards the received second message on the basis of the determination result.

10 Claims, 13 Drawing Sheets

TERMINAL DEVICE

CROSS REFERENCE TO RELATED APPLICATIONS

This application is related to and claims priority under 35 U.S.C. §119(e) to Provisional Application Ser. No. 61/604,597, filed Feb. 29, 2012, the contents of which are hereby incorporated herein by reference.

BACKGROUND

1. Field

The present disclosure relates to a client device that receives electronic messages.

2. Description of the Related Art

There are two types of electronic messages which a client device can use to transmit and receive messages: carrier mail, in which a mobile phone operator provides its own domain, and Short Message Service messages (hereinafter designated SMS messages) which are transmitted using a phone number. Carrier mail is transmitted via an electronic mail server established by the operator, and messages can be transmitted not only among mobile phone client devices, but also to mobile phone client devices from various client devices able to access the Internet.

SMS messages are transmitted and received among mobile phone client devices via a message center set up by the operator. SMS messages may also be passed among multiple operators.

Carrier mail and SMS messages have respective merits and demerits. For this reason, users divide their usage of the two types of messages according to context. For example, a carrier mail message may be transmitted to a party whose carrier mail address is known, whereas an SMS message may be transmitted to a party for whom only a phone number is known. Carrier mail addresses can be changed comparatively easily by the user him- or herself. Also, since the domain differs for each operator, the carrier mail address is also changed in the case where the user changes his or her contracting carrier.

Meanwhile, since SMS messages use phone numbers as addresses, there is little likelihood of the address (phone number) being changed. Even in the case of changing operators, a mobile phone client device can keep the same phone number by utilizing a MNP (Mobile Number Portability) system.

PTL 1 describes an address list update process conducted in a mobile phone client device in the case of a change of mail address.

CITATION LIST

Patent Literature

[PTL] Japanese Unexamined Patent Application Publication No. 2011-114841

As discussed above, there is a high likelihood of a change of carrier mail address. Thus, in the case where a recipient party's address has changed, a carrier mail message transmitted by a client device will not reach that party. In such cases, it is impossible to transmit carrier mail to the party with a changed address unless the new mail address is known.

Meanwhile, client devices have functions for preventing the receipt of spam messages. For example, an incoming message may be blocked in the case where the source address of the received message is not registered in an address list in the client device. Configuring a client device in this way can prevent the receipt of messages from unknown persons, and is effective at preventing the receipt of spam messages.

However, since there is a likelihood of a change of carrier mail address as discussed earlier, it is possible that an address registered in an address list in a client device has changed. Consequently, the client device of a user who is using functions for blocking the receipt of spam messages by utilizing an address list will be unable to receive carrier mail messages from the new address. In this way, changing a mail address may cause the problem of mail-based communication becoming non-functional.

Meanwhile, besides the carrier mail discussed above, webmail provided by an Internet webmail provider is another type of message transmitted and received by mobile phone client devices. Webmail is a service in which a web server is set up on the Internet and messages are transmitted and received by client devices able to access the Internet. Mobile phone client devices are also able to use webmail instead of carrier mail, as long as Internet access is available. In the following description, carrier mail and webmail will be collectively designated email. Although email typically refers to electronic messages in general, in this specification references to email do not include SMS messages.

The inventor has recognized the need to be able to reliably conduct mail-based communication even if there is a change of mail address.

BRIEF SUMMARY

A client device of the present disclosure is provided with a first message receiver that receives a first message from an external device; a second message receiver that receives a second message from the external device; a display unit that displays one of the first message received by the first message receiver and the second message received by the second message receiver; and a controller that determines whether or not a specific address or a specific keyword is stated in the body of the second message received by the second message receiver, and discards the received second message on the basis of the determination result.

A communication method of the present disclosure, which is implemented on a client device, includes receiving a first message from an external device; receiving a second message from the external device; displaying one of the first message and the second message; and determining whether or not a specific address or a specific keyword is stated in the body of the second message, and discarding the received second message on the basis of the determination result.

A computer readable storage medium of the present disclosure, which is encoded with computer executable instructions, which when executed by a client device, cause the client device to perform a method that includes receiving a first message from an external device; receiving a second message from the external device; displaying one of the first message and the second message; and determining whether or not a specific address or a specific keyword is stated in the body of the second message, and discarding the received second message on the basis of the determination result.

According to the present disclosure, it becomes possible for a client device to reliably receive messages from another party, even if there has been a change of address and the other party is unaware of the change of address. For this reason, email-based communication can be reliably conducted with another party who has not been contacted by email for a long time. Also, it becomes possible to reliably transmit a notification indicating that the sender's client device has had a change of mail address.

DETAILED DESCRIPTION

Hereinafter, examples of a client device, message receiving method, and program according to an embodiment of the present disclosure will be described in the following order and with reference to the drawings.
1. First embodiment
1-1. Summary (FIG. 1)
1-2. Configuration of client device (FIG. 2, FIG. 3)
1-3. Exemplary operation and display at sender and receiver (FIGS. 4 to 6)
2. Second embodiment
2-1. Configuration of client device (FIG. 7)
2-2. Exemplary operation and display at sender at receiver (FIG. 8, FIG. 9)
2-3. Exemplary receiving processes (FIGS. 10 to 13)
3. Modifications
<1. First Embodiment>
[1-1. Summary]

Figure 1:
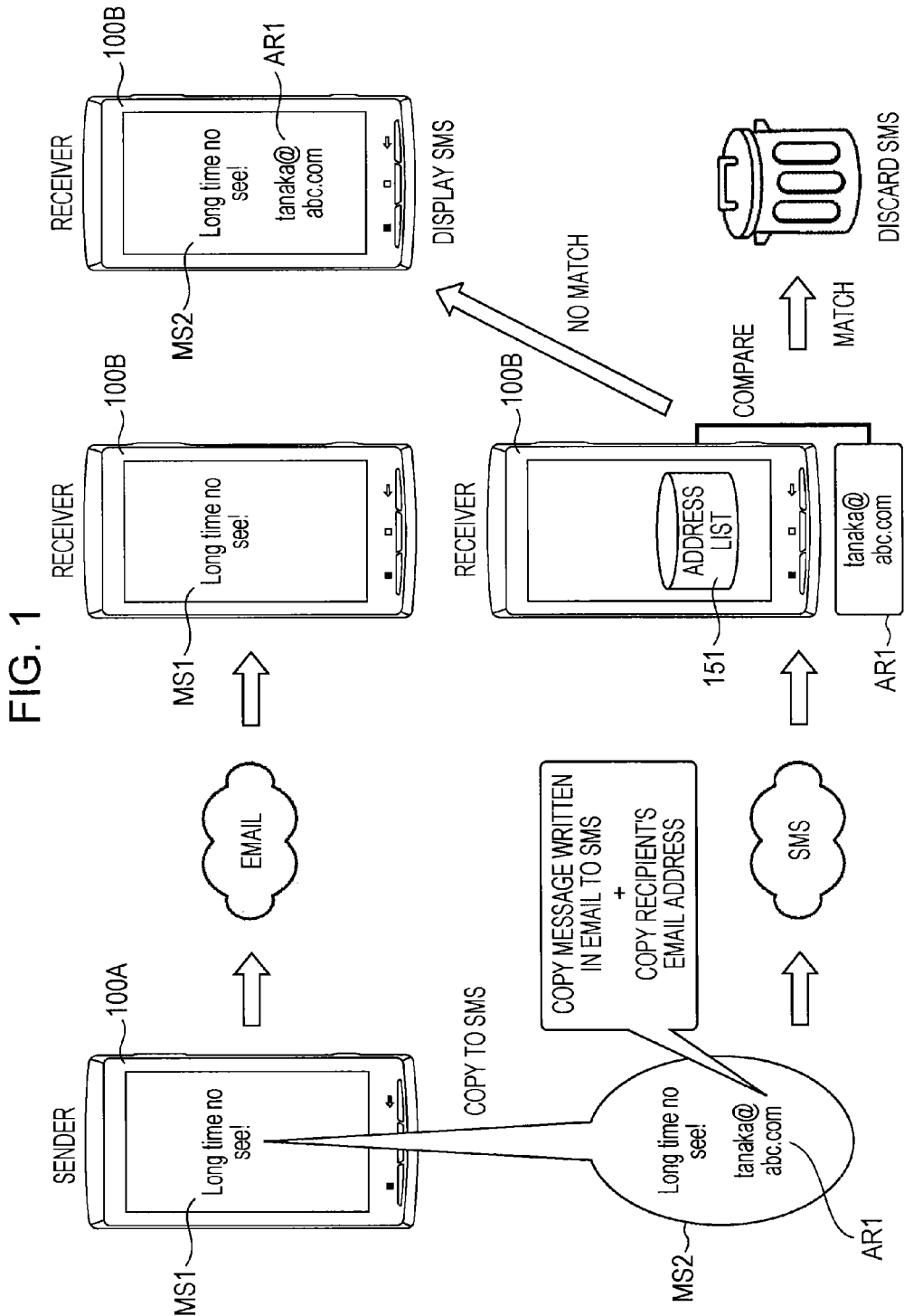
FIG. 1 is an explanatory diagram illustrating an exemplary message transmission state according to a first embodiment of the present disclosure.

First, operation of an example of the first embodiment will be summarized with reference to FIG. 1. FIG. 1 is a diagram illustrating the flow in the case of transmitting a message from a mobile phone client device 100A acting as sender to a mobile phone client device 100B acting as receiver. The respective mobile phone client devices 100A and 100B are provided with email transmitting/receiving functions and SMS message transmitting/receiving functions. Email herein uses carrier mail provided by a network operator, for example. Alternatively, webmail using a mail server set up by an Internet webmail provider, etc. may be used as email. With such carrier mail and webmail, client devices transmit and receive messages by exchanging information with a mail server according to a prescribed communication protocol. With carrier mail and webmail, an address is specified by a combination of the alphabet, numerical digits, and "@". SMS messages are transmitted to a recipient specified by a phone number, using the phone number as an address. Meanwhile, the receiving of a message by a client device may be automatically conducted when a message is stored on the mail server, or may be conducted when the receiving client device accesses the mail server. Emails may be received by the mobile phone client device 100B by either method. SMS messages are automatically delivered to the receiving mobile phone client device 100B.

As illustrated in the upper-left of FIG. 1, the user possessing the mobile phone client device 100A uses the mobile phone client device 100A to input message text MS1. Upon completing input of the message text MS1, the user presses an email send button. Once the email send button is pressed, the mobile phone client device 100A conducts an email transmission process. At this point, the address given to the receiving mobile phone client device 100B is set as the recipient address, and thus an email arrives at the corresponding mobile phone client device 100B. Then, the display unit of the mobile phone client device 100B displays the received message text MS1.

The foregoing is a typical flow for transmitting and receiving email. Additionally, in the present embodiment, the mobile phone client device 100A conducts a message send condition determination process when the send button of the mobile phone client device 100A is pressed. Details of the determination process will be discussed later. When it is determined in this message send condition determination process that the conditions for simultaneous email and SMS transmission are satisfied, the mobile phone client device 100A creates message text MS2 in which the email recipient address AR1 has been added to the message text MS1. The mobile phone client device 100A then transmits the message text MS2 by SMS. This SMS message is a message that takes a phone number as the recipient address, with the recipient phone number being determined from an address list possessed by the mobile phone client device 100A.

Next, operation of the receiving mobile phone client device 100B will be described. When the mobile phone client device 100B receives an SMS message, the address AR1 stated in the message text MS2 of the received SMS message is extracted. The mobile phone client device 100B then determines whether or not the extracted address AR1 matches its own address in an address list 151 possessed by the mobile phone client device 100B. In the case of determining a match, the mobile phone client device 100B discards the received SMS message. Also, in the case of determining that the addresses do not match, the mobile phone client device 100B displays the message text MS2 of the received SMS message, as illustrated in the upper-right of FIG. 1.

By conducting such a process, the receiving mobile phone client device 100B becomes able to reliably receive messages from another user, even in cases where mobile phone client device 100B's own email address has been changed and the other user is unaware of the change of address.

In other words, in the case where the receiving mobile phone client device 100B's own mail address matches the mail address in the address list possessed by the sending mobile phone client device 100B, the receiving mobile phone client device 100B displays just the email message text MS1. In contrast, in the case where the receiving mobile phone client device 100B's own mail address has been changed, the receiving mobile phone client device 100B's own mail address will not match the mail address in the address list possessed by the sending mobile phone client device 100A. In this case, the receiving mobile phone client device 100B will be unable to receive the email containing the message text MS1, since the recipient email address is incorrect. However, even in cases where the address AR1 stated in the received SMS message does not match the mail address possessed by the receiving mobile phone client device 100B in this way, the received SMS message will be displayed by the receiving mobile phone client device 100B without being discarded. In other words, the receiving mobile phone client device 100B becomes able to receive a message from the sending mobile phone client device 100B, even in cases where the receiving mobile phone client device 100B's own email address has been changed and the sending mobile phone client device 100A is unaware of the address change. Hereinafter, details for conducting processes according to the principle illustrated in FIG. 1 will be described.

[1-2. Configuration of Client Device]

Figure 2:
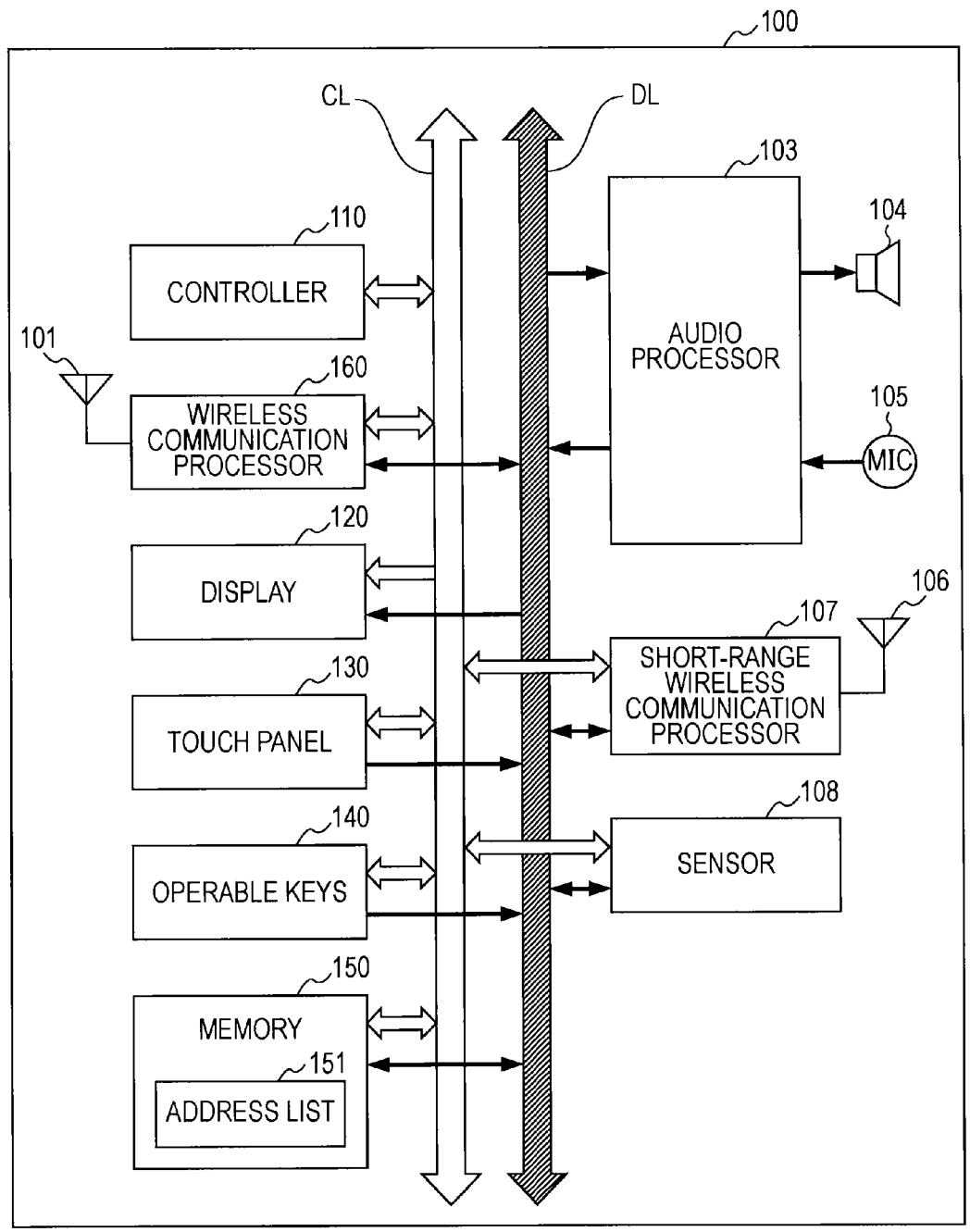
FIG. 2 is a block diagram illustrating an exemplary configuration of a client device according to a first embodiment of the present disclosure.

FIG. 2 is a diagram illustrating a configuration of a mobile phone client device 100. In FIG. 1, separate numerals are given to the sending mobile phone client device 100A and the receiving mobile phone client device 100B, but these client devices 100A and 100B have the same configuration, and hereinafter will be indicated as the mobile phone client devices 100 in cases where it is not necessary to distinguish between sender and receiver.

A mobile phone client device 100 is provided with an antenna 101 for wirelessly communicating with a mobile phone base station. The antenna 101 is connected to a wireless communication processor 160. The wireless communication processor 160, under control by a controller 110, conducts processes to transmit and receive wireless signals. The controller 110 transmits control commands to the wireless communication processor 160 via a control line CL. The controller 110 controls the respective parts of the mobile phone client device 100 by reading out a program (software) stored in memory 150 via the control line CL, and executing the program. The memory 150 provided in the mobile phone client device 100 stores data prepared in advance, such as programs, together with data generated by user operations. The memory 150 stores and reads out data under control by the controller 110. The memory 150 is provided with an address list 151.

The address list 151 is a list storing phone numbers, mail addresses, etc. for individual names (personal names, company names, etc.) registered by the user. The address list 151 also stores the phone number and mail address given to the mobile phone client device 100 itself. The 151 may store phone numbers and mail addresses input by user operations, and may also automatically store information on the basis of a history of transmitted and received messages in the mobile phone client device 100. The memory 150 also stores a history of transmitted messages and a history of received messages.

During audio telephony, telephony audio data received by the wireless communication processor 160 is supplied to an audio processor 103 via a data line DL. The audio processor 103 demodulates supplied audio data to obtain an analog audio signal. The analog audio signal obtained by the audio processor 103 is supplied to a speaker 104, and audio is output from the speaker 104. Also, during audio telephony, the audio processor 103 converts an audio signal output by a microphone 105 into audio data in a transmission format. Then, the audio data converted by the audio processor 103 is supplied to the wireless communication processor 160 via the data line DL. Also, audio data supplied to the wireless communication processor 160 is packetized and wirelessly transmitted.

In the case of conducting data communication or transmitting/receiving messages via a network such as the Internet, a wireless communication processor 102 transmits and receives under control by the controller 110. For example, data received by the wireless communication processor 160 may be stored in the memory 150, and a display or other process based on the stored data may be conducted under control by the controller 110. Also, data stored in the memory 150 is supplied to the wireless communication processor 1602 and wirelessly transmitted. In cases where it is necessary to discard received message data, the controller 110 deletes data stored in the memory 150.

The mobile phone client device 100 is provided with a display unit 120. The display unit 120 displays images and various information on a display panel under control by the controller 110. A liquid crystal display or organic EL (electroluminescence) display panel may be used as the display panel, for example. The mobile phone client device 100 is also provided with a touch panel 130. The touch panel 130 detects a touch position when the surface of the display panel is touched with an object such as a finger or stylus. Data on a touch position detected by the touch panel 130 is transmitted to the controller 110. The mobile phone client device 100 is also provided with operable keys 140. Operation information regarding the operable keys 140 is transmitted to the controller 110. However, most operations on the mobile phone client device 100 are conducted by touch panel operations using the touch panel 130, with the operable keys 140 conducting only a few operations.

The mobile phone client device 100 is also provided with a short-range wireless communication processor 107 connected to an antenna 106. The short-range wireless communication processor 107 conducts short-range wireless communication with a nearby client device or access point. The short-range wireless communication processor 107 wirelessly communicates with peers within a range of approximately several tens of meters, for example, implementing the wireless LAN protocol prescribed as the IEEE 802.11 standard or the protocol named Bluetooth (registered trademark). The mobile phone client device 100 uses the short-range wireless communication processor 107 in the case of accessing the Internet, for example. Also, in some cases email is transmitted or received by short-range wireless communication using the short-range wireless communication processor 107.

The mobile phone client device 100 is also provided with a sensor unit 108. The sensor unit 108 includes sensors that detect the motion and orientation of the device, such as an acceleration sensor and a geomagnetic sensor, for example, as well as sensors that detect the conditions surrounding the device, such as a proximity sensor.

Figure 3:
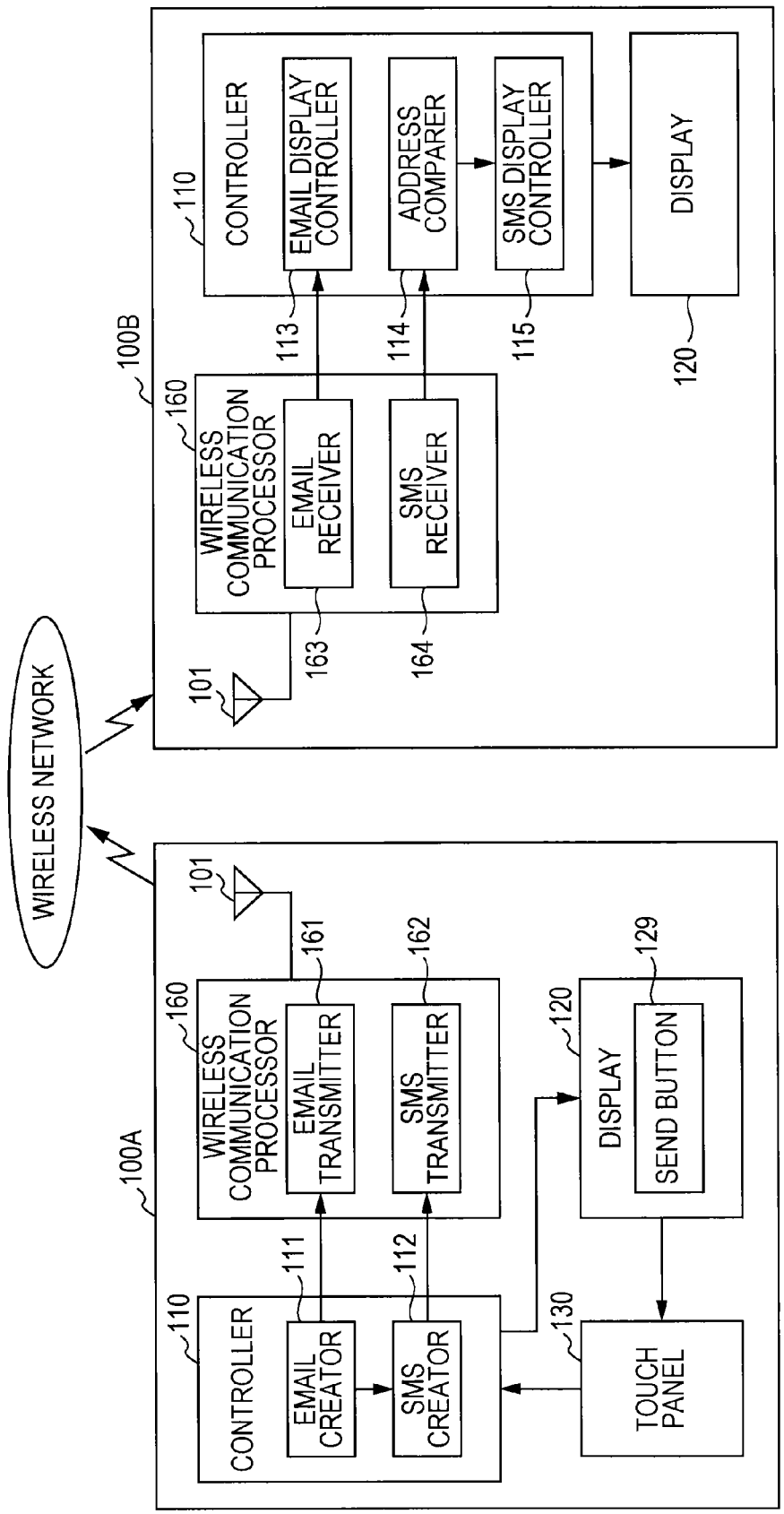
FIG. 3 is a function block diagram of a sending client device and a receiving client device according to a first embodiment of the present disclosure.

FIG. 3 is a function block diagram illustrating a sending mobile phone client device 100A and a receiving mobile phone client device 100B seen from the perspective of transmitting and receiving messages. The respective processors in the controller 110 and the wireless communication processor 160 illustrated in FIG. 3 are virtually created by instructions from the controller 110 as a result of executing respective software that manages the transmitting and receiving of messages. When the user issues instructions for email creation, the display unit 120 displays a screen for inputting email message text and a screen for inputting a recipient. A recipient is input by selecting a person's name from an address list, for example. By selecting a person's name, an email address corresponding to that person's name is set as the recipient. An address may also be input directly in the case of transmitting to a party that does not exist in the address list. Then, once email message text and a recipient have been input by the user, a send button 129 is displayed on the display screen of the display unit 120.

If the touch panel 130 detects that the send button 129 has been touched with the user's finger, etc., the controller 110 is informed of the operation. When the email send button 129 has been pressed, the controller 110 makes a conditional determination on whether it is necessary to transmit an SMS message contemporaneously with an email. Then, when it is determined that it is necessary to transmit an SMS message, an SMS message creator 112 of the controller 110 creates an SMS message.

The SMS message creator 112 creates message text in which the recipient email address has been added to the message text of an email created by an email creator 111. The recipient email address added to the message text in an SMS message at this point is placed at a specific position, such as at the beginning or the end of the message text in the SMS message. Also, the SMS message creator 112 retrieves a phone number corresponding to the recipient address of the email created by the email creator 111 from an address list stored in the memory 150. The SMS message creator 112 then sets the retrieved phone number as the SMS message recipient.

However, the character length of the message text that can be transmitted in a single SMS message is limited to a comparatively short character length. For this reason, in the case where the message text of an email created by the email creator 111 exceeds the SMS message character limit, the email message text is shortened to create the message text of the SMS message. At such times, it is configured such that the leading portion and title of the email message text is stated in the message text of the SMS message. Alternatively, when shortening the email message text, words that seem to be important in the email message text are stated in the shortened message text of the SMS message. For example, it may be configured such that mail addresses containing "@" or phone numbers consisting of multi-digit numbers are included in the shortened message text of the SMS message.

Then, the email created by the email creator 111 is sent to an email transmitter 161 in the wireless communication processor 160. The email transmitter 161 conducts an email transmission process. Email data that has been processed for transmission by the email transmitter 161 is wireless transmitted from the antenna 101. Also, the SMS message created by the SMS message creator 112 is sent to an SMS message transmitter 162 in the wireless communication processor 160. The SMS message transmitter 162 conducts an SMS message transmission process. Then, SMS message data that has been processed for transmission by the SMS message transmitter 162 is wirelessly transmitted from the antenna 101. Note that although FIG. 3 describes an example in which email is wirelessly transmitted from the wireless communication processor 160, email may also be wirelessly transmitted from the short-range wireless communication processor 107.

The receiving mobile phone client device 100B is provided with an email receiver 163 and an SMS message receiver 164 in the wireless communication processor 160. Email transmitted from the sending mobile phone client device 100A is received and processed by the email receiver 163. Email data received and processed by the email receiver 163 is supplied to an email display controller 113 in the controller 110. The email display controller 113 causes the display unit 120 to display the message text and title, etc. of a received email.

An SMS transmitted from the sending mobile phone client device 100A is received and processed by the SMS message receiver 164. Then, the SMS message data received and processed by the SMS message receiver 164 is supplied to an address comparer 114 in the controller 110. The address comparer 114 extracts the address stated in the message text of the received SMS message, and determines whether or not the extracted address matches the client device 100B's own mail address. The client device 100B's own mail address is acquired from an address list stored in the memory 150.

In the case where the address comparer 114 determines that the addresses are different, or in the case where an address is not stated in the message text of the SMS message, the address comparer 114 instructs an SMS message display controller 115 to display the received SMS message. Under control by the SMS message display controller 115 based on the instructions, the display unit 120 displays the message text of the received SMS message. Also, in the case of determining that the addresses match, the address comparer 114 instructs the SMS message display controller 115 to discard the received SMS message. The SMS message display controller 115, having received the instructions, deletes the relevant SMS message data from the memory 150. By discarding the SMS message in this way, the message text of the discarded SMS message will not be displayed.

[1-3. Exemplary Operation and Display at Sender and Receiver]

Figure 4:
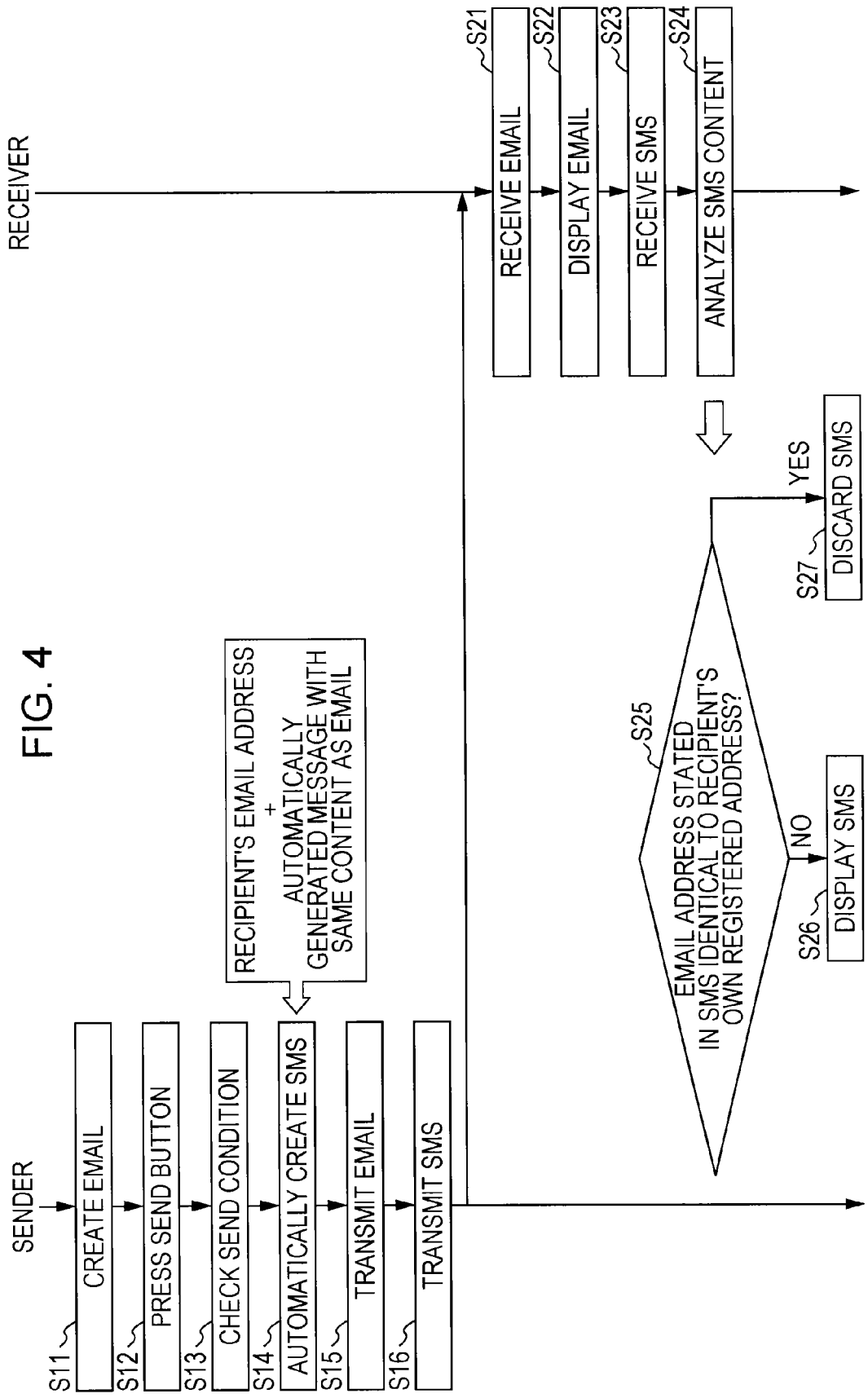
FIG. 4 is a flowchart illustrating operation of a sending client device and a receiving client device according to a first embodiment of the present disclosure.

FIG. 4 is a flowchart illustrating the flow of a process in which a mobile phone client device 100A transmits an email and a mobile phone client device 100B receives an email. The operations in step S11 to S16 on the left side are transmit operations at the mobile phone client device 100A. The operations in steps S21 to S27 on the right side are receive operations at the mobile phone client device 100B.

First, the sending mobile phone client device 100A conducts an email creation process (step S11). Subsequently, when the email send button 129 (FIG. 3) is pressed by the user (step S12), the controller 110 makes a conditional determination on contemporaneous SMS message transmission (step S13). The conditional determination on contemporaneous SMS message transmission will be described with the next flowchart in FIG. 5. Then, when the contemporaneous SMS message transmission condition has been satisfied, the controller 110 conducts an automatic SMS message creation process (step S14). In the automatically created SMS message, the message text and recipient of the email created in step S11 is stated in the message text. However, the email message text may also be partial. Subsequently, the email created in step S11 is transmitted (step S15), and the SMS message created in step S14 is transmitted (step S16).

Next, operations at the receiving mobile phone client device 100B will be described. Upon receiving an email (step S21), the receiving mobile phone client device 100B displays the message text and source address of the received email (step S22). Also, upon receiving an SMS message (step S23), the receiving mobile phone client device 100B analyzes the message text of the received SMS message (step S24). SMS message analysis is conducted by the address comparer 114 illustrated in FIG. 3. The address comparer 114 extracts an address included in the message text of the received SMS message, and determines whether or not the extracted address matches the client device 100B's own mail address (step S25).

Then, in the case where it is determined in step S25 that the addresses do not match, the controller 110 causes the display unit 120 to display the message text of the received SMS message (step S26). Also, in the case where it is determined in step S25 that the addresses do match, the controller 110 discards the received SMS message data (step S27). Herein, the flowchart in FIG. 4 illustrates an example where the mobile phone client device 100B receives an SMS message after receiving an email. However, this receive order is an example and may be reversed. In other words, in some cases the mobile phone client device 100B may receive an email after receiving an SMS message.

Next, the conditional determination on contemporaneous SMS message transmission conducted by the sending mobile phone client device 100A will be described with reference to the flowchart in FIG. 5. This determination process is an illustration of the details of the conditional determination on transmission in step S13 of the flowchart in FIG. 4. First, the controller 110 determines whether or not the recipient address of a created email is stored in the address list 151 (step S101). In this determination, when it is determined that the email recipient address is in the address list 151, the controller 110 searches the transmit history for prior emails and determines whether or not a transmission to the same recipient address exists within a fixed period Da of the past (step S102). The fixed period Da is taken to be a comparatively long period, such as three months or six months, for example. The fixed period Da may be freely set by user operations.

Then, when it is determined that a transmission to the same recipient address does not exist within the fixed period Da of the past, the controller 110 activates an automatic SMS message creation process (step S103). In the case where it is determined in step S101 that the recipient address is not stored in the address list 151, the controller 110 ends the process without activating the automatic SMS message creation process. Likewise, the controller 110 ends the process without activating the automatic SMS message creation process in the case where it is determined in step S102 that a transmission to the same recipient address exists within the fixed period Da of the past. After activating the automatic SMS message creation process in step S103, the controller 110 conducts the automatic SMS message creation process illustrated in step S14 of the flowchart in FIG. 4.

Figure 5:
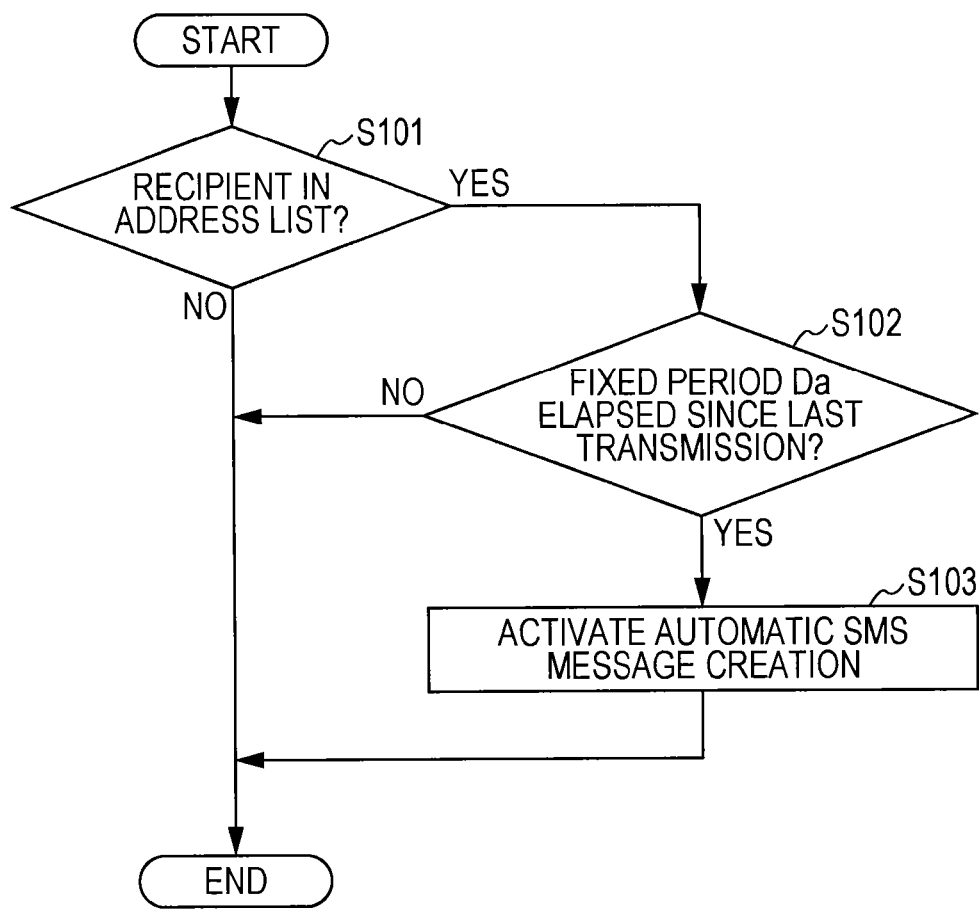
FIG. 5 is a flowchart illustrating an exemplary process for determining whether to conduct automatic SMS message creation in a sending client device according to a first embodiment of the present disclosure.

By conducting the determination process illustrated by the flowchart in FIG. 5, the controller 110 of the sending mobile phone client device 100A is able to conduct automatic SMS message creation as appropriate. Namely, the controller 110 conducts contemporaneous transmission of an email and an SMS message when transmitting a message to an address for which no message transmit history exists in a fixed period of the past.

Figure 6A:
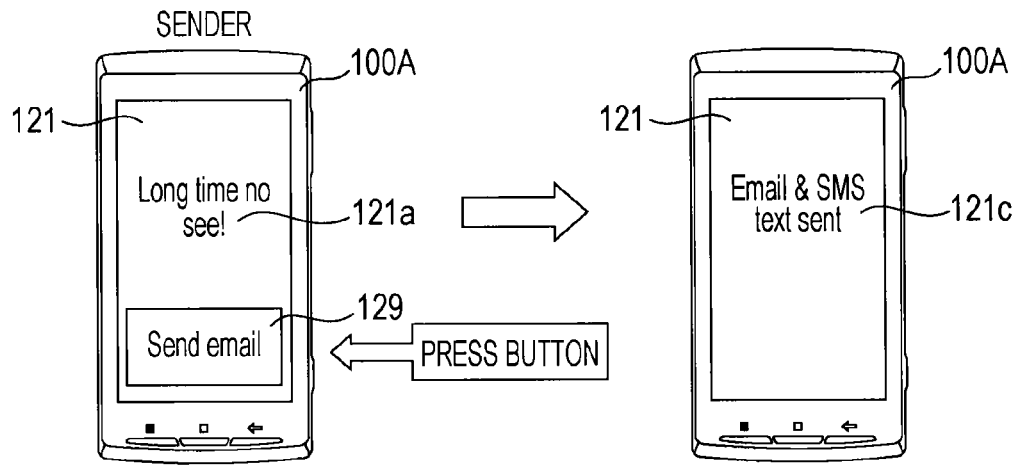
FIG. 6 is a diagram illustrating exemplary display screens on a sending client device (A) and a receiving client device (B) according to a first embodiment of the present disclosure.

FIG. 6 illustrates exemplary display screens on a display panel 121 in the case of transmitting an email according to the process illustrated by the flowchart in FIG. 4. The display panel 121 illustrated in FIG. 6 is a panel provided in the display unit 120 of the mobile phone client devices 100A and 100B. As illustrated on the left side of FIG. 6A, the display panel 121 of the sending mobile phone client device 100A displays email message text 121a and the send button 129. Then, if the user performs a button operation touching the send button 129, an email and an SMS message are transmitted, and the display panel 121 displays an email and SMS message "transmission complete" message 121c, as illustrated on the right side of FIG. 6A. This "transmission complete" message 121c is an example for the case of transmitting both an email and an SMS message. In the case of transmitting an email only, the "transmission complete" message 121c indicates transmission of an email only.

Figure 6B:
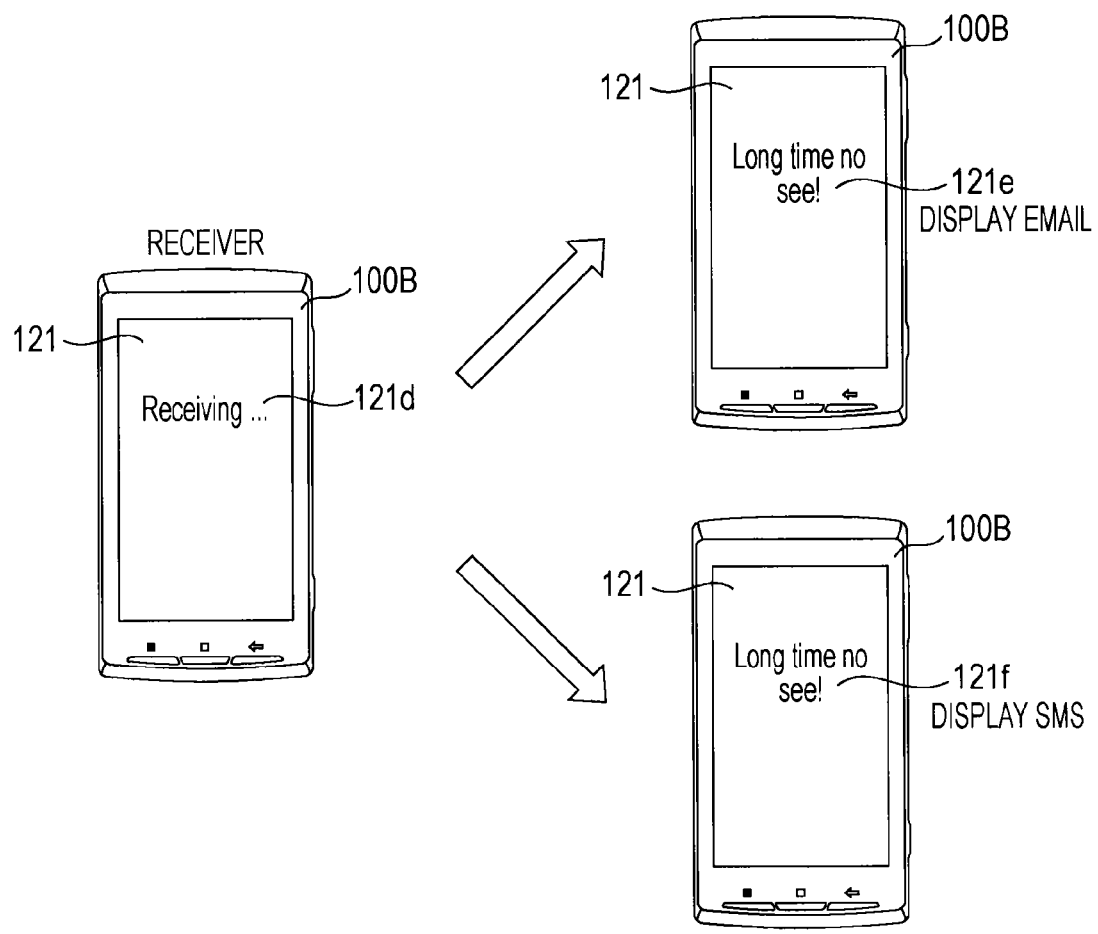

Then, once the email and SMS message transmitted by the mobile phone client device 100A arrive at the receiving mobile phone client device 100B, the display panel 121 of the receiving mobile phone client device 100B displays a "receiving . . . " message 121d, as illustrated on the left side of FIG. 6B. In the case where the message received at this point is an email (carrier mail or webmail), the display panel 121 displays an "email received" message 121e, as illustrated in the upper-right of FIG. 6B. Also, in the case where the received message is an SMS message, the display panel 121 displays an "SMS message received" message 121f, as illustrated in the lower-right of FIG. 6B. Meanwhile, as described with the flowchart in FIG. 4, in the case where the address stated in the message text of the received SMS message is the receiving mobile phone client device 100B's own address, the received SMS message is discarded. Consequently, the example in which the "received" message 121f is displayed as illustrated in FIG. 6B is an example in which the address do not match and the SMS message is not discarded.

In this way, the mobile phone client device 100B displays the message text of an SMS message only in the case where the address stated in the message text does not match its own address, or the case where an address is not stated in the message text. For this reason, the mobile phone client device 100B is able to display a received SMS message even in cases where its own email address has changed. However, in the case where the email address has changed, an email transmitted by the mobile phone client device 100A will not reach the mobile phone client device 100B. In this way, by conducting a process of the present embodiment, a message transmitted by the user's client device reliably reaches another party by SMS, even in cases where the recipient client device has had a change of email address and the user is unaware of the change of email address. Furthermore, since the received SMS message is discarded in cases where the address of the recipient client device has not changed, the mobile phone client device 100B will not display two messages with the same content.

<2. Second Embodiment>

[2-1. Configuration of Client Device]

Next, a second embodiment will be described with reference to FIGS. 7 to 13. In FIGS. 7 to 13, like numerals are given to portions identical to those of FIGS. 1 to 6 described earlier in the first embodiment, and detailed description thereof will be reduced or omitted. Similarly to the foregoing first embodiment, in the second embodiment a mobile phone client device 100A is used to transmit an email and an SMS message. In the second embodiment, the operation in the case of contemporaneously transmitting an email and an SMS message at the sending mobile phone client device 100A and the operation when discarding a received SMS message at the receiving mobile phone client device 100B differ from the operation described in the first embodiment.

Figure 7:
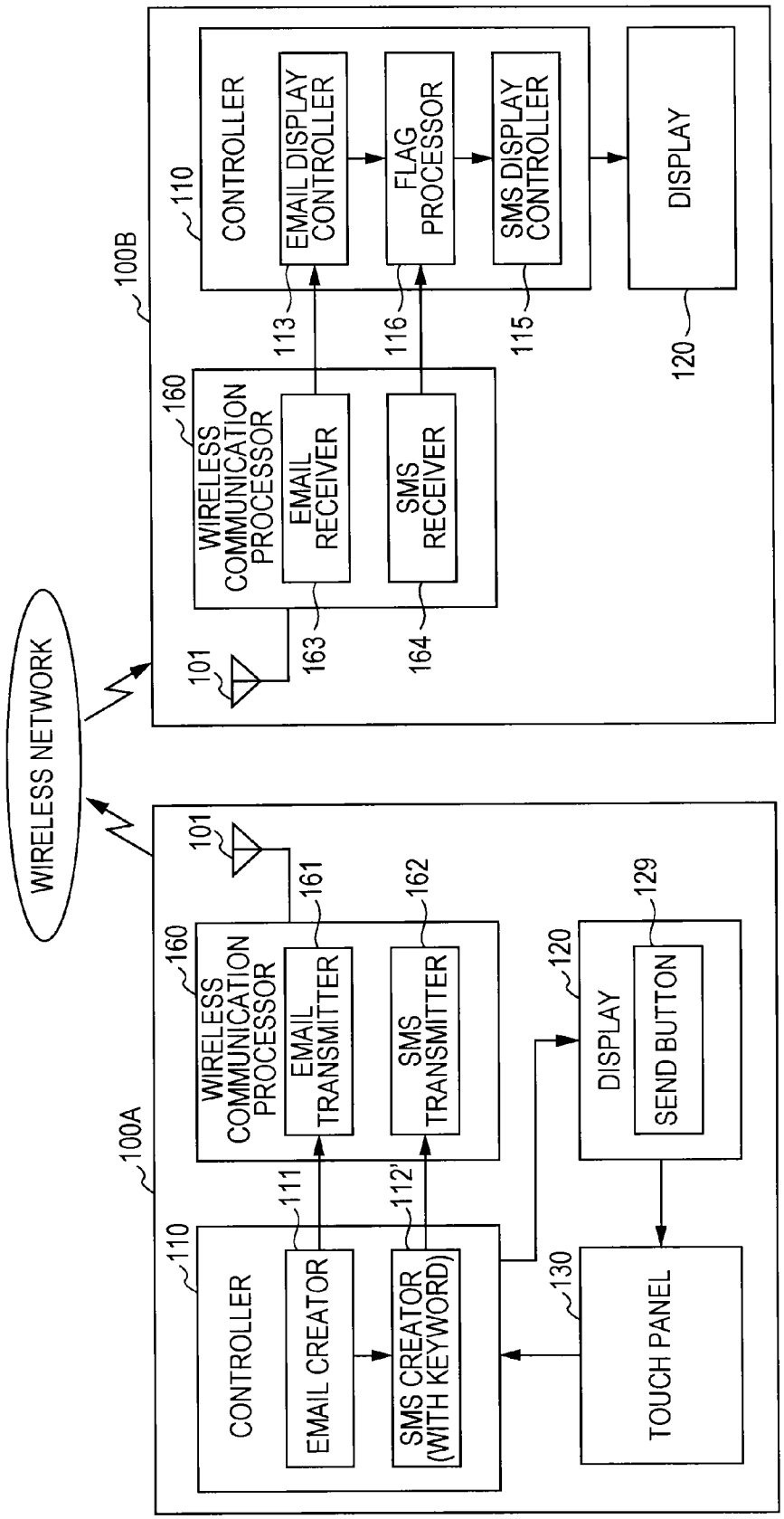
FIG. 7 is a function block diagram of a sending client device and a receiving client device according to a second embodiment of the present disclosure.

FIG. 7 is a function block diagram illustrating a sending mobile phone client device 100A and a receiving mobile phone client device 100B seen from the perspective of transmitting and receiving messages in the second embodiment. The respective processors in the controller 110 and the wireless communication processor 160 illustrated in FIG. 7 are virtually created by instructions from the controller 110 as a result of executing respective software that manages the transmitting and receiving of messages.

The configuration of the sending mobile phone client device 100A illustrated in FIG. 7 is the same as that of the mobile phone client device 100A illustrated in FIG. 3, but differs in that when an SMS message creator 112' in the sending mobile phone client device 100A creates an SMS message, a predetermined keyword is added within the message text. The predetermined keyword is "change of address" in this example. Also, it is unnecessary to add a recipient address as described in the first embodiment.

The receiving mobile phone client device 100B is provided with an email receiver 163 and an SMS message receiver 164 in the wireless communication processor 160. An email transmitted from the sending mobile phone client device 100A is received and processed by the email receiver 163. Then, email data received and processed by the email receiver 163 is supplied to the email display controller 113 in the controller 110. The email display controller 113 displays the message text and title, etc. of the received email on the display unit 120. The controller 110 is also provided with a flag processor 116. The flag processor 116 determines whether or not a specific keyword is stated in the message text or title of the received email. Herein, the keyword is taken to be "change of address". Then, when it is determined that the specific keyword exists, the flag processor 116 conducts a flag-raising process. Herein, information on a flag raised by the flag processor 116 is stored in the memory 150, for example. Also, a flag raised by the flag processor 116 is returned to its original state once a fixed amount of time has elapsed.

Then, an SMS message transmitted from the sending mobile phone client device 100A is received and processed by the SMS message receiver 164. The SMS message receiver 164 determines whether or not the specific keyword "change of address" is stated in the message text of the received and processed SMS message. Then, the SMS message receiver 164 discards the received SMS message in the case of detecting the specific keyword "change of address" from the message text of the SMS message while in a state where the flag processor 116 has raised a flag. However, the SMS message receiver 164 stands by for a predetermined period (five minutes, for example) in the case where the specific keyword "change of address" is included in the SMS message received by the SMS message receiver 164 and where a flag it not raised. Then, the SMS message receiver 164 discards the SMS message in the case where the email receiver 163 receives an email with the specific keyword "change of address" stated in its message text or title while the predetermined period is elapsing. In the case where the predetermined period elapsed and the email receiver 163 does not receive an email with the specific keyword "change of address" stated in its message text or title, the display unit 120 displays the message text of the received SMS message.

[2-2. Exemplary Operation and Display at Sender at Receiver]

Figure 8:
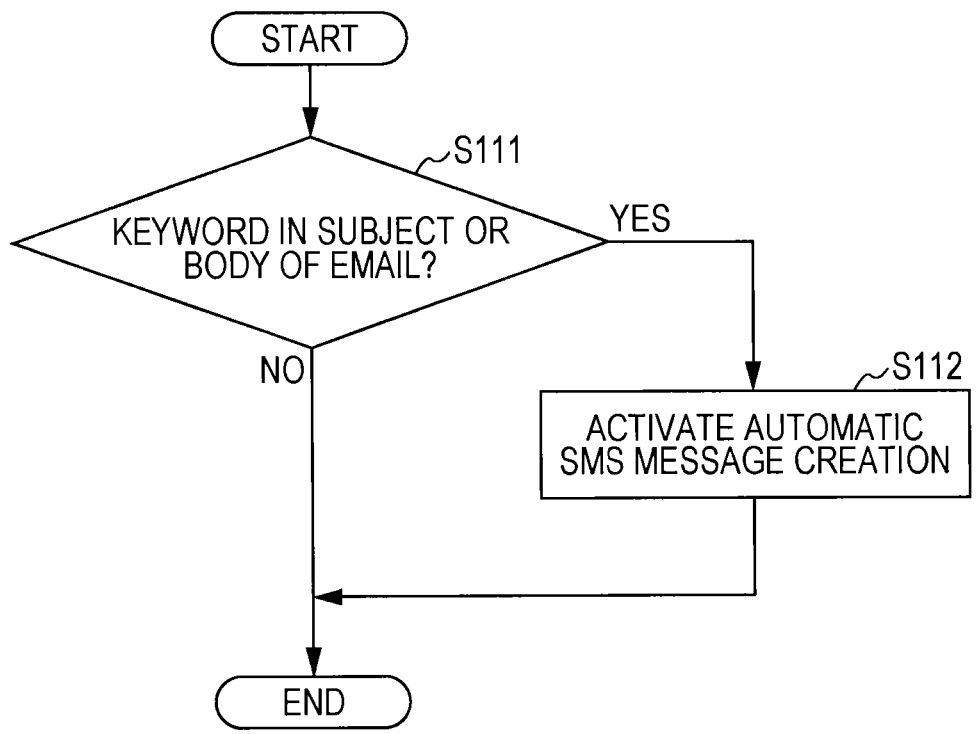
FIG. 8 is a flowchart illustrating an exemplary process for determining whether to conduct automatic SMS message creation in a sending client device according to a second embodiment of the present disclosure.

FIG. 8 is a flowchart illustrating a process conducted by the sending mobile phone client device 100A in the case of transmitting an email. First, the controller 110 determines whether or not the specific keyword "change of address" is stated in either the title or message text in the body of a created email (step S111). In this determination, when it is determined that the specific keyword "change of address" is stated, the controller 110 activates an automatic SMS message creation process (step S112). In the case of determining in step S111 that the specific keyword "change of address" is not stated, the controller 110 ends the process without activating the automatic SMS message creation process. The controller 110 conducts the automatic SMS message creation process after having activated the automatic SMS message creation process in step S112. During this automatic SMS message creation, the controller 110 adds the keyword "change of address" to the message text of the SMS message. The controller 110 may add the specific keyword "change of address" at any position in the message text.

By conducting the determination process illustrated by the flowchart in FIG. 8, the controller 110 of the sending mobile phone client device 100A is able to conduct automatic SMS message creation as appropriate. Namely, the controller 110 conducts automatic contemporaneous transmission of an email and an SMS message in the case of transmitting an email stating the specific keyword "change of address". Consequently, the mobile phone client device 100A conducts contemporaneous transmission of an email and an SMS message in the case of announcing a change of address by email.

Figure 9A:
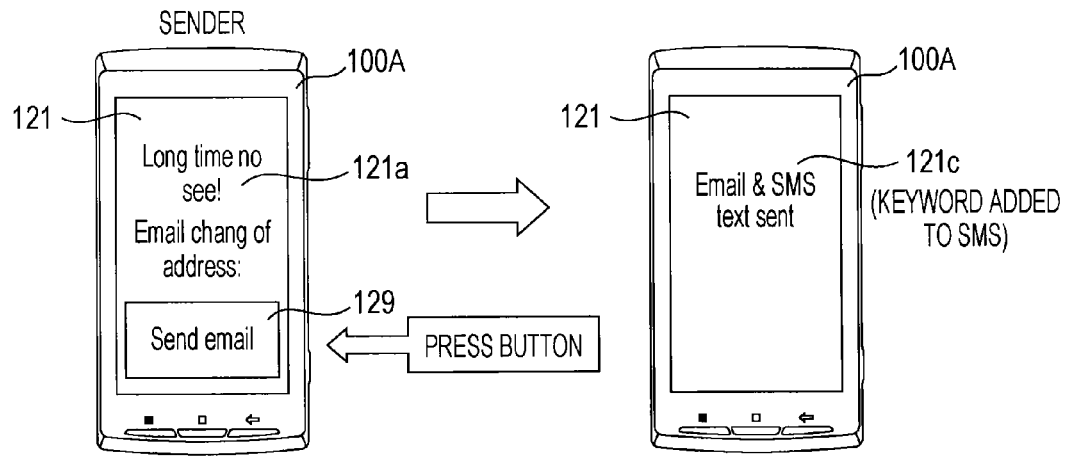
FIG. 9 is a diagram illustrating exemplary display screens on a sending client device (A) and a receiving client device (B) according to a second embodiment of the present disclosure.

FIG. 9 illustrates exemplary display screens on the display panel 121 in the case where the mobile phone client device 100A transmits an email. As illustrated on the left side of FIG. 9A, the display panel 121 of the sending mobile phone client device 100A displays email message text 121a and the send button 129. Herein, the keyword "change of address" is included in the message text 121a input by the user. Then, if the user performs a button operation touching the send button 129, an email and an SMS message are transmitted, and the display panel 121 displays an email and SMS message "transmission complete" message 121c, as illustrated on the right side of FIG. 9A. The keyword "change of address" is included in the SMS message transmitted at this point.

Figure 9B:
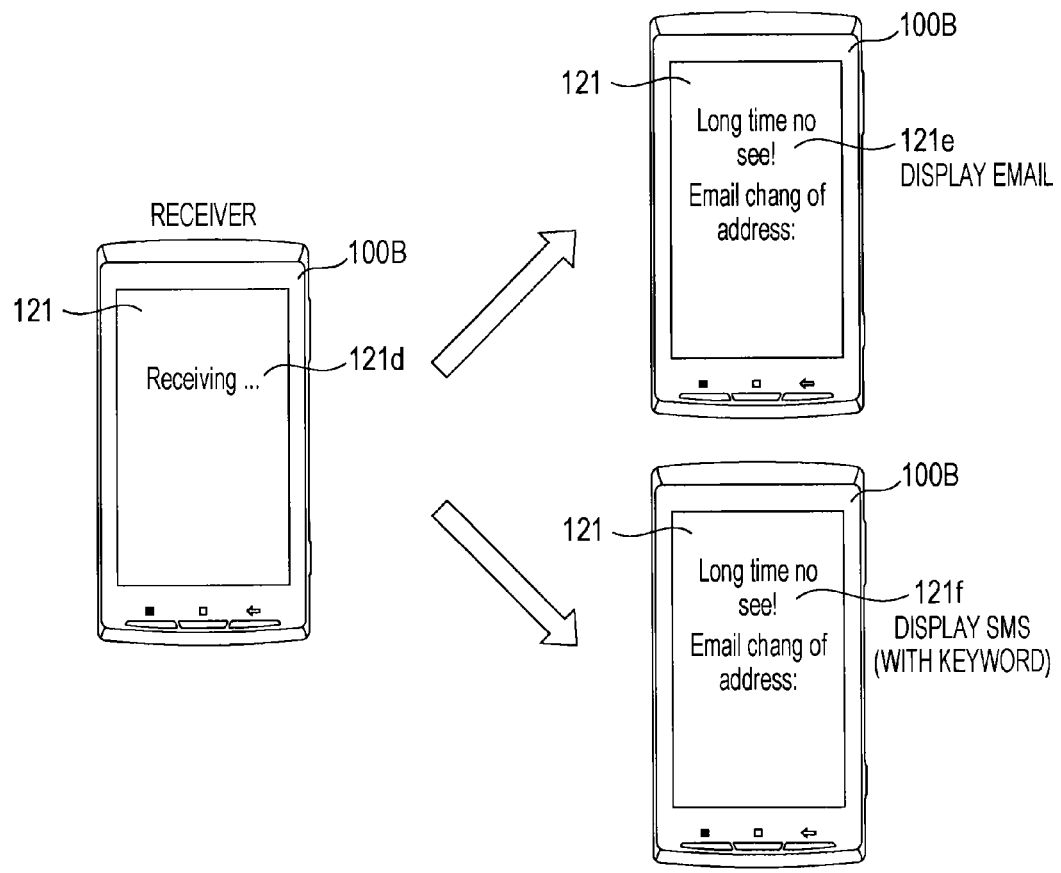

Then, once the email and SMS message transmitted by the mobile phone client device 100A arrive at the receiving mobile phone client device 100B, the display panel 121 of the receiving mobile phone client device 100B displays a "receiving . . ." message 121d, as illustrated on the left side of FIG. 9B. In the case where the message received at this point is an email (carrier mail or webmail), the display panel 121 displays an "email received" message 121e, as illustrated in the upper-right of FIG. 9B. Also, in the case where the received message is an SMS message, the display panel 121 displays an "SMS message received" message 121f, as illustrated in the lower-right of FIG. 9B. However, in the case where the keyword "change of address" is included in the message text of the SMS message, the display of the "received" message 121f by the display panel 121 is limited to the case of not conducting the SMS message discarding operation illustrated by the following exemplary operation in FIG. 10 and thereafter.

[2-3. Exemplary Receiving Processes]

Next, exemplary operation in the case where the mobile phone client device 100B receives messages transmitted by the mobile phone client device 100A will be described with reference to the sequence diagrams in FIGS. 10 to 13. In the examples in FIGS. 10 to 13, email is received in the form of carrier mail. The respective examples in FIGS. 10 to 13 differ in the order in which an email and an SMS message are received.

Figure 10:
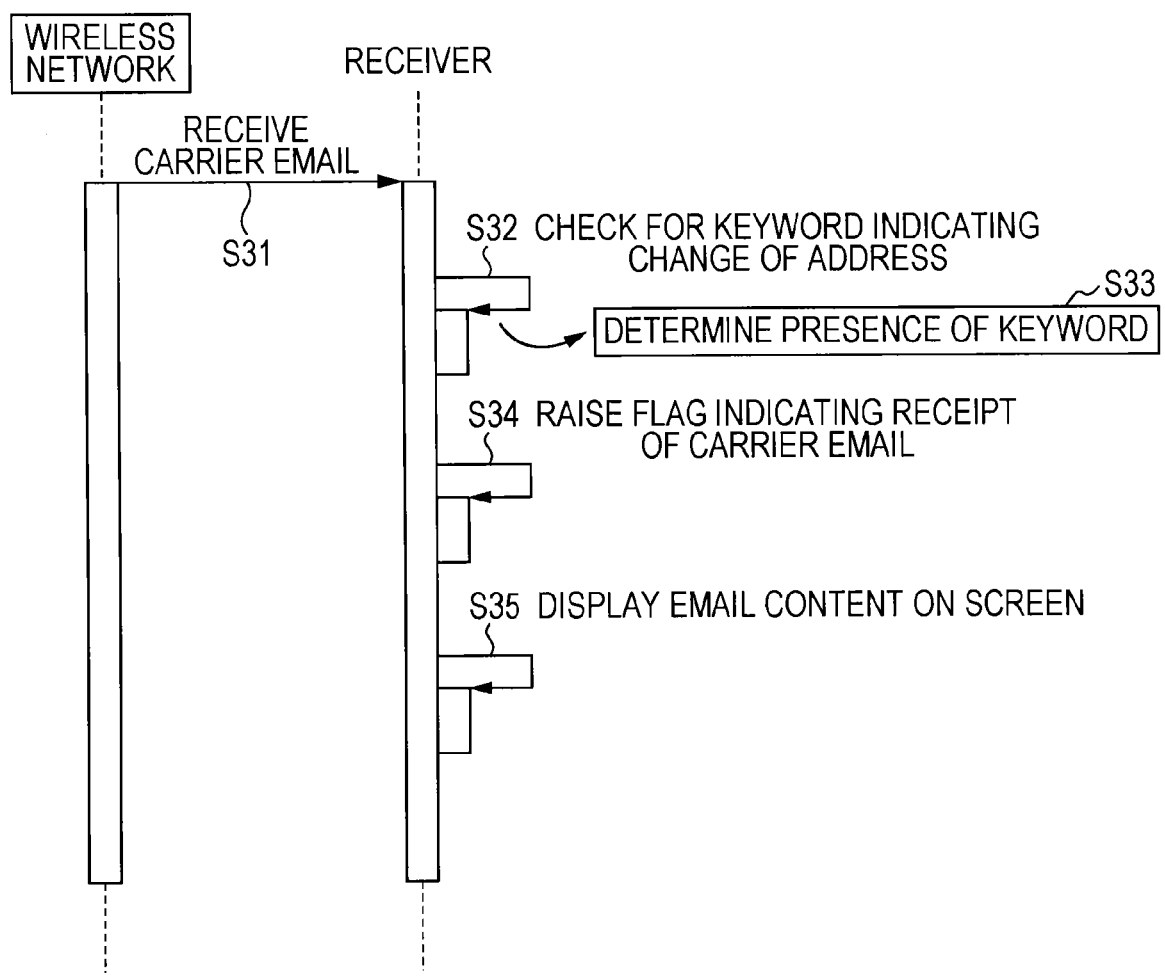
FIG. 10 is a operational sequence diagram for a sending client device and a receiving client device according to a second embodiment of the present disclosure (Example 1).

FIG. 10 is an example of the case where the mobile phone client device 100B receives a carrier mail message. When the mobile phone client device 100B receives a carrier mail message (step S31), the controller 110 in the mobile phone client device 100B determines whether or not the keyword "change of address" exists in the received carrier mail message (step S32). In this example, the controller 110 is taken to determine that the keyword "change of address" does exist (step S33). At this point, the controller 110 conducts a flag-raising process (step S34). Then, the display unit 120 displays the title, message text, and sender's name of the received carrier mail message (step S35).

Figure 11:
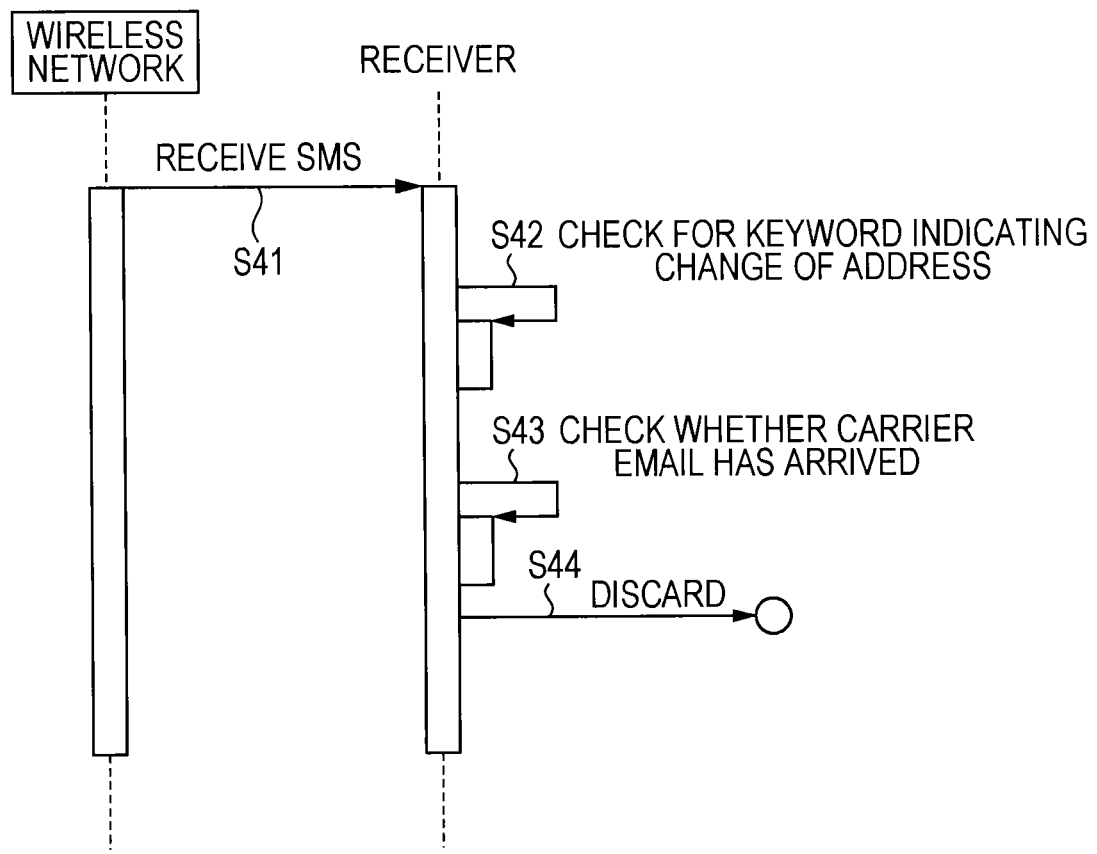
FIG. 11 is a operational sequence diagram for a sending client device and a receiving client device according to a second embodiment of the present disclosure (Example 2).

FIG. 11 is an example of the case where the mobile phone client device 100B has already received a carrier mail message at the time of receiving an SMS message. When the mobile phone client device 100B receives an SMS message (step S41), the controller 110 in the mobile phone client device 100B determines whether or not the keyword "change of address" exists in the received SMS message (step S42). In this example, the controller 110 is taken to determine that the keyword "change of address" does exist. At this point, the controller 110 determines whether or not a flag is raised, and from the flag checks if a carrier mail message has arrived (step S43). Herein, the controller 110 discards the received SMS message in the case of determining that the flag is raised (step S44). By discarding it in this way, the received SMS message is not displayed.

Figure 12:
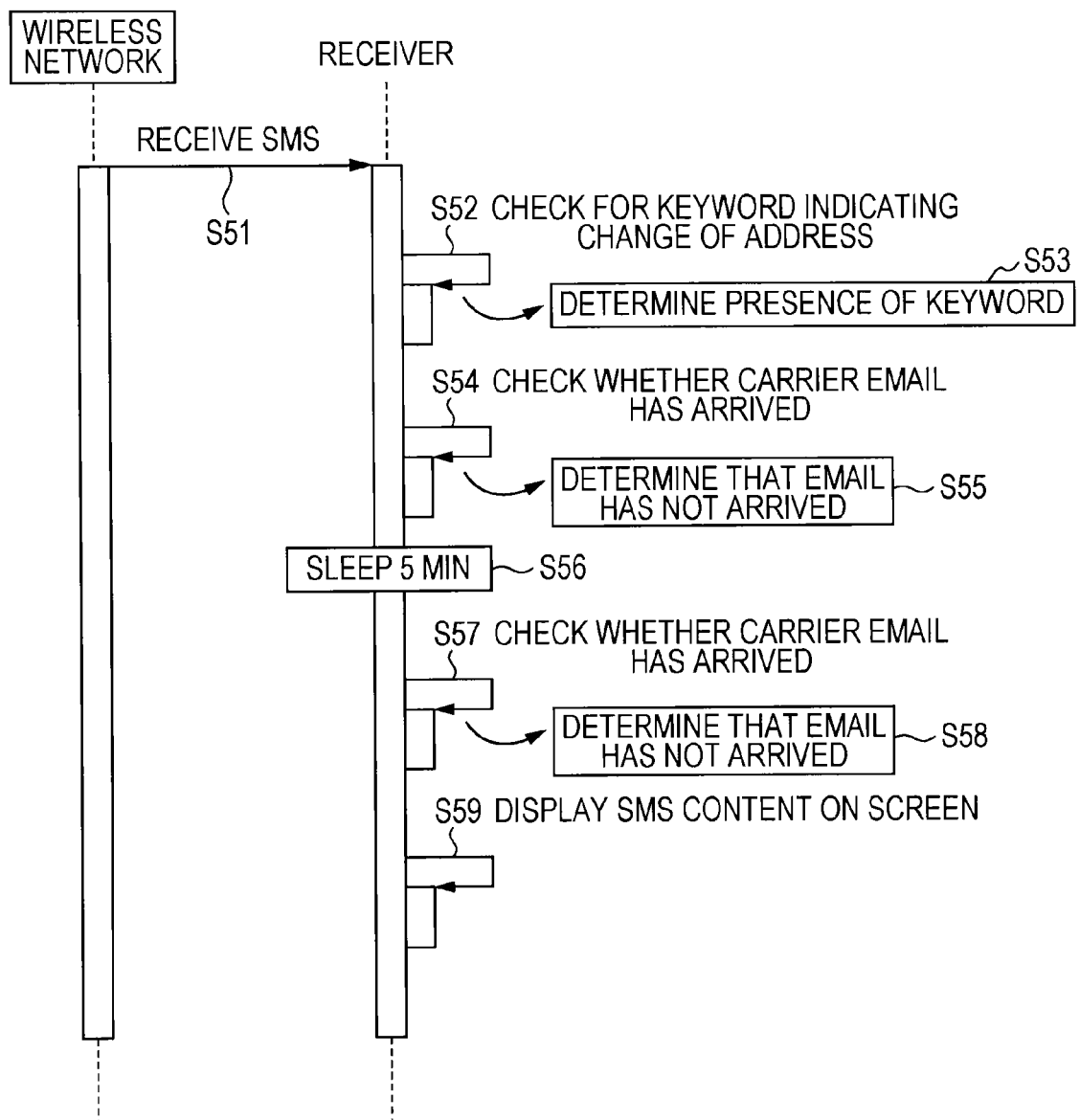
FIG. 12 is a operational sequence diagram for a sending client device and a receiving client device according to a second embodiment of the present disclosure (Example 3).

FIG. 12 is an example of the case where the mobile phone client device 100B receives an SMS message before a carrier mail message. When the mobile phone client device 100B receives an SMS message (step S51), the controller 110 in the mobile phone client device 100B determines whether or not the keyword "change of address" exists in the received SMS message (step S52). In this example, it is taken to be determined that the keyword "change of address" does exist (step S53). Next, the controller 110 determines whether or not a flag is raised, and from the state of the flag checks if a carrier mail message has arrived (step S54). Herein, the controller 110 determines that a carrier mail message has not been received in the case where the flag is not raised (step S55). However, in step S54 the mobile phone client device 100B may also access the carrier mail server to check if a carrier mail message has arrived.

Then, upon determining that a carrier mail message has not been received, the controller 110 stands by for a predetermined, fixed amount of time (step S56). Herein, the fixed amount of time is taken to be five minutes. After standing by for the fixed amount of time, the controller 110 once again checks if a carrier mail message has arrived (step S57). Herein, it is again determined that a carrier mail message has not been received when conducting the check in step S57 (step S58). Then, when it is determined in step S58 that a carrier mail message has not been received, the display unit 120 displays the message text of the received SMS message (step S59).

Figure 13:
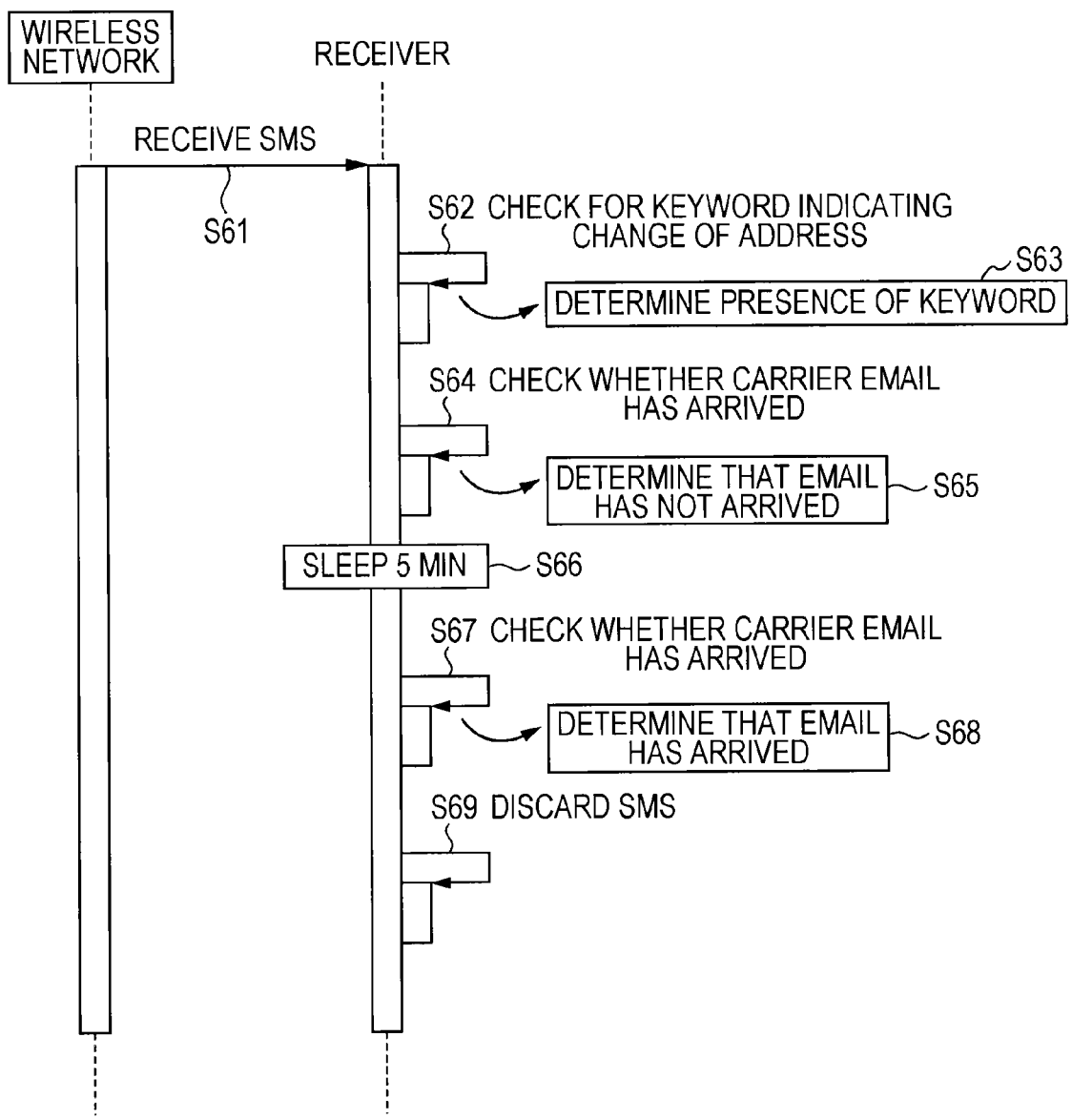
FIG. 13 is a operational sequence diagram for a sending client device and a receiving client device according to a second embodiment of the present disclosure (Example 4).

FIG. 13 is an example of the case where the mobile phone client device 100B receives a carrier mail message after receiving an SMS message. When the mobile phone client device 100B receives an SMS message (step S61), the controller 110 in the mobile phone client device 100B determines whether or not the keyword "change of address" exists in the received SMS message (step S62). In this example, it is determined that the keyword "change of address" does exist (step S63). Next, the controller 110 determines whether or not a flag is raised, and from the flag checks if a carrier mail message has arrived (step S64). Herein, the flag is not raised, and thus the controller 110 determines that a carrier mail message has not been received (step S65).

Then, upon determining that a carrier mail message has not been received, the controller 110 stands by for a predetermined, fixed amount of time (five minutes) (step S66). After standing by for the fixed amount of time, the controller 110 once again checks if a carrier mail message has arrived (step S67). Herein, it is determined that a carrier mail message has been received (step S68). Then, when it is determined in step S68 that a carrier mail message has been received, the controller 110 discards the received SMS message (step S69). Meanwhile, the carrier mail message determined to have been received in step S68 is displayed on the display unit 120 upon being received.

As a result of the mobile phone client device 100B conducting an SMS message receiving process in this way, the mobile phone client device 100B discards an SMS message and displays an email in the case of successfully receiving both an email and an SMS message contemporaneously transmitted from a sender. Alternatively, the mobile phone client device 100B displays an SMS message in the case of successfully receiving an SMS message only. Consequently, the mobile phone client device 100B becomes able to reliably receive a message containing the keyword "change of address". For this reason, it becomes possible to reliably inform another party of a change of email address. For example, a change of address can be announced even in cases where the receiving mobile phone client device 100B's mail address has been changed from the email address registered in the sending mobile phone client device 100A's address list. Also, since the receiving mobile phone client device 100B discards the SMS message in the case of receiving both an email and an SMS message transmitted contemporaneously, duplicate display of messages with the same content will not occur.

<3. Modifications>

Meanwhile, the process of adding an address to the message text of an SMS message described in the first embodiment may also be combined with the process of adding a specific keyword to the message text of an SMS message described in the second embodiment. In this case, the sending mobile phone client device 100A conducts both the determination illustrated by the flowchart in FIG. 5 and the determination illustrated by the flowchart in FIG. 8. In addition, the receiving mobile phone client device 100B both determines if its own email address is stated in the message and also determines if a specific keyword is stated. In so doing, it becomes possible to handle both the case of contacting another party who has not been contacted by email in a long time, and the case of announcing a change of address.

Also, the keyword "change of address" described in the second embodiment is an example, and it may also be configured such that the sending mobile phone client device 100A adds other keywords. For example, the keyword may be taken to be simply "address". Furthermore, the amount of time that the receiving mobile phone client device 100B stands by in the case of receiving an SMS message but not receiving an email may be an amount of time other than five minutes.

Also, although the first and second embodiments discussed above are applied to a mobile phone client device, the present disclosure may also be applied to another client device able to receive two types of messages such as email and SMS. For example, the present disclosure may also be applied to a client device provided with a comparatively large display panel, referred to as a tablet. Also, although the first and second embodiments discussed above are applied to a client device provided with a receiver that receives email (carrier mail or webmail) and a receiver that receives SMS messages, the present disclosure is also applicable to various types of client devices having a first message receiver in which an address is specified by a combination of the alphabet, numerical digits, and "@", and a second message receiver in which an address is specified by a multi-digit number, such as a phone number.

Also, a program that executes the operations described in the first or second embodiment in order as a procedure may be created, and the program may be installed on an information processing device. In this case, the program is stored in various media. Alternatively, a client device (information processing device) may access a specific server and download the program.

Also, the configurations and processes stated in the claims of the present disclosure are not limited to the foregoing embodiments. It is to be understood as obvious by persons skilled in the art that various alterations, combinations, and other embodiments may occur depending on design or other factors insofar as they are within the scope of the claims or their equivalents.

Furthermore, the present disclosure may also take configurations like the following.

(1) A client device provided with a first message receiver that receives a first message, a second message receiver that receives a second message, a display unit that displays the first message received by the first message receiver and the second message received by the second message receiver, and a controller that determines whether or not a specific address or a specific keyword is stated in the body of the second message received by the second message receiver, and discards the received second message on the basis of the determination result.

(2) The client device according to (1), wherein the controller discards the received second message in the case where the client device's own address is stated in the body of the second message received by the second message receiver.

(3) The client device according to (1) or (2), wherein the controller discards the received second message in the case where the specific keyword is stated in the second message received by the second message receiver and where the first message receiver has received the first message from the source of the second message.

(4) The client device according to (3), wherein the controller raises a flag in the case where the specific keyword is stated in the first message received by the first message receiver, and when the flag is raised, determines whether or not the specific keyword is stated when the second message is received by the second message receiver.

(5) The client device according to (3), wherein the controller displays the received second message without discarding it when the first message receiver has not successfully received the first message from the source of the second message after a given amount of time has elapsed since the second message receiver received the second message stating the specific keyword.

(6) The client device according to any of (1) to (5), wherein the source client device that transmits the first message and the second message contemporaneously transmits the first message and the second message to a receiving client device whose address has not appeared in a history of transmitted messages for a fixed period.

(7) The client device according to any of (1) to (5), wherein the source client device that transmits the first message and the second message contemporaneously transmits the first message and the second message in the case of transmitting a first message having the specific keyword in its body or title.

(8) A message receiving method including a first message receiving step in which a first message is received, a second message receiving step in which a second message taking a phone number as its address is received, and a controlling step in which it is determined whether or not a specific address or a specific keyword is stated in the body of the second message received in the second message receiving step, and in which the received second message is discard on the basis of the determination result.

(9) A program for causing an information processing device to execute a first message receiving operation in which a first message is received, a second message receiving operation in which a second message taking a phone number as its address is received, and a controlling step in which it is determined whether or not a specific address or a specific keyword is stated in the body of the second message received in the second message receiving operation, and in which the received second message is discard on the basis of the determination result.

REFERENCE SIGNS LIST

100: mobile phone client device
100A: sending mobile phone client device
100B: receiving mobile phone client device
101: antenna
103: audio processor
104: speaker
105: microphone
106: antenna
107: short-range wireless communication processor
108: sensor unit
110: controller
111: email creator
112: SMS message creator
113: email display controller
114: address comparer
115: SMS message display controller
116: flag processor
120: display unit
129: send button
130: touch panel
150: memory
151: address list
160: wireless communication processor
161: email transmitter
162: SMS message transmitter
163: email receiver
164: SMS message receiver

What is claimed is:

1. A client device comprising:
circuitry configured to
receive a second message from an external device, the second message including message text identical to message text included in a first message that was transmitted from the external device to the client device; and
a display unit that displays one of the first message and the second message,
wherein the circuitry determines whether or not a specific address or a specific keyword is stated in a body of the second message, and discards the received second message and controls the display unit to display the first message when the circuitry has received the first message and the circuitry determines that the specific address or specific keyword is stated in the body of the second message, and displays the second message, without discarding the second message, when the specific address or specific keyword is not stated in the body of the second message and the circuitry has not received the first message.

2. The client device according to claim 1, wherein the specific address or the specific keyword indicates a user who sent the first message, and a determination result is whether information of the user is stored in the client device.

3. The client device according to claim 1, wherein the first message is received as an e-mail and the second message is received as a SMS (Short Message Service) message.

4. The client device according to claim 1, wherein when the client device receives the second message before receiving the first message, the circuitry waits to receive the first message before discarding the second message.

5. The client device according to claim 1,
wherein the circuitry is further configured to transmit a first message to an external device; and
transmit a second message to the external device,
wherein the transmitted second message includes a specific address or a specific keyword in the body of the second message that indicates a user of the client device.

6. The client device according to claim 1, wherein the circuitry discards the received second message when the client device's own address is stated in the body of the second message.

7. The client device according to claim 1, wherein the circuitry
raises a flag when the specific keyword is stated in the received first message, and
when the flag is raised, determines whether or not the specific keyword is stated when the second message is received.

8. The client device according to claim 1, wherein
the circuitry causes the display to display the received second message without discarding it when the circuitry has not successfully received the first message from the external device after a given amount of time has elapsed since the circuitry received the second message stating the specific address or keyword.

9. A communication method, implemented on a client device, including
receiving a second message from an external device, the second message including message text identical to message text included in a first message that was transmitted from the external device to the client device;
displaying one of the first message and the second message; and
determining whether or not a specific address or a specific keyword is stated in a body of the second message, and discarding the received second message and controlling the displaying to display the first message when receiving the first message and the specific address or specific keyword is determined to be stated in the body of the second message, and displaying the second message, without discarding the second message, when the specific address or specific keyword is not stated in the body of the second message and the client device has not received the first message.

10. A non-transitory computer readable storage medium encoded with computer executable instructions, which when executed by a client device, cause the client device to perform a method comprising:
receiving a second message from an external device, the second message including message text identical to message text included in a first message that was transmitted from the external device to the client device;
displaying one of the first message and the second message; and
determining whether or not a specific address or a specific keyword is stated in a body of the second message, and discarding the received second message and controlling the displaying to display the first message when receiving the first message and the specific address or specific keyword is determined to be stated in the body of the second message, and displaying the second message, without discarding the second message, when the specific address or specific keyword is not stated in the body of the second message and the client device has not received the first message.

* * * * *